US010638765B2

(12) United States Patent
Mercuri

(10) Patent No.: US 10,638,765 B2
(45) Date of Patent: May 5, 2020

(54) OPENWORK FABRIC

(71) Applicant: Merctech Pty Ltd, Holden Hill (AU)

(72) Inventor: Ennio Mercuri, Holden Hill (AU)

(73) Assignee: Merctech Pty Ltd, Holden Hill (AU)

( * ) Notice: Subject to any disclaimer, the term of this patent is extended or adjusted under 35 U.S.C. 154(b) by 348 days.

(21) Appl. No.: 14/682,339

(22) Filed: Apr. 9, 2015

(65) Prior Publication Data

US 2015/0289525 A1    Oct. 15, 2015

(30) Foreign Application Priority Data

Apr. 9, 2014    (AU) ............................ 2014202014

(51) Int. Cl.
*A22C 13/00* (2006.01)
*B65D 30/06* (2006.01)
*D04B 21/12* (2006.01)
*D04B 25/02* (2006.01)

(52) U.S. Cl.
CPC ............. *A22C 13/00* (2013.01); *B65D 29/04* (2013.01); *A22C 2013/0056* (2013.01); *D04B 21/12* (2013.01); *D04B 25/02* (2013.01); *D10B 2401/061* (2013.01); *D10B 2505/10* (2013.01)

(58) Field of Classification Search
CPC ................. B29D 22/00; B29D 28/00; A22C 2013/0056; A22C 13/00; D02G 3/32; D04B 21/12; D04B 21/18; D10B 2505/10; B65D 29/04; D01B 2401/061; Y10T 428/1324; Y10T 428/1362
USPC ................ 428/34.1–35.9, 34.8, 36.1; 442/1; 138/118.1, 118
See application file for complete search history.

(56) References Cited

U.S. PATENT DOCUMENTS

| | | | | |
|---|---|---|---|---|
| 3,251,201 A | * | 5/1966 | Newman ............... | B65B 25/067 66/192 |
| RE26,496 E | * | 12/1968 | Krauss et al. ....... | A22C 7/0046 66/193 |
| 3,866,444 A | * | 2/1975 | Levin ...................... | D02G 3/32 66/195 |
| 4,467,595 A | * | 8/1984 | Kramers .................. | D01D 5/08 264/210.2 |
| 5,868,612 A | * | 2/1999 | Mercuri ................. | D04B 21/12 138/118.1 |
| 7,247,359 B1 | * | 7/2007 | Mercuri ................. | A22C 13/00 138/118.1 |

(Continued)

FOREIGN PATENT DOCUMENTS

DE    2912961 A1 * 10/1980    ............. A22C 13/00

OTHER PUBLICATIONS

How to Macrame a Plant Hanger, https://thisyearsdozen.wordpress.com/2009/05/27/how-to-macrame-a-plant-hanger/#comment-16462, May 27, 2009.*

(Continued)

*Primary Examiner* — Camie S Thompson
(74) *Attorney, Agent, or Firm* — Maier & Maier, PLLC

(57) ABSTRACT

An improved tubular openwork fabric or net for food products, the openwork fabric including alternating cojoined and intermediate members, each intermediate member including a filament assembly and each cojoined member including a pair of filament assemblies that are worked together, the filament assemblies being extensible and the open work fabric being extensible in both longitudinal and transverse directions.

12 Claims, 4 Drawing Sheets

(56) References Cited

U.S. PATENT DOCUMENTS

| | | | |
|---|---|---|---|
| 7,687,122 B2* | 3/2010 | Huckfeldt | A22C 13/00 426/105 |
| 2003/0054747 A1* | 3/2003 | Hihnala | A22C 11/003 452/50 |

OTHER PUBLICATIONS

Machine translation of DE 2912961 A1, Oct. 2017.*

* cited by examiner

OPENWORK FABRIC

TECHNICAL FIELD

The present invention relates to an improved tubular openwork fabric or net for food products. In a particular form the present invention relates to improved use of composite thread for a tubular net or netting.

BACKGROUND

The present invention may find many applications, and these applications may not be limited to the food industry. However, for easy description, the invention will be described in relation to its application for use in the food industry. In the following description, the terms "casing", "food product" and "netting" shall have the following meanings:

a. "casing" any synthetic or natural tubular material used in the processing of food products such as meat products,
  b. "food product" any fresh or processed food products, and in particular fresh or processed meat products, and
  c. "netting" any knitted, woven, extruded or otherwise manufactured packaging netting which is elasticated, rigid, laterally extendible and or longitudinally extendible.

In the manufacture of food products, and in particular in respect of the manufacture of meat products, natural or artificial casings in the form of elongated tubes are normally either pumped full of meat from a machine specifically designed for the purpose, or have portions of meat placed within the tube prior to either a cooking or a curing process taking place. In some cases, machines dealing with minced meat products use a feed mechanism for injecting meat through a delivery tube or injection horn where the casing is shirred onto the external surface of the delivery tube. A clip or other closure means is placed over the end of the casing, and a quantity of meat is then injected into the casing. Depending on the desired length of the meat product, the process is interrupted at various stages so that clips or twists may be applied to form separate and individual meat product portions.

In addition, whole meat portions may be inserted within tubular casing and, in this instance, stuffing tubes or horns are also used which enables the tubular casing to be stretched, whereupon meat portions can be readily introduced within the tubular casing. In some cases, artificial skins such as collagen-based casings or fibrous casings have a tubular net or netting placed over the outside of the collagen once the food product is located within the casing. Alternatively, the food product may be inserted directly within the netting without the use of any inner casing. In many instances, the netting is used primarily for decorative effect and remains in place prior to consumption of the food product. However, in addition to providing a decorative effect, the netting, if properly sized, can be used to produce a surface pattern effect. In this instance, the cojoined and intermediate members of the net apply a force to the surface of the meat product and, provided that the surface of the food product is sufficiently resilient, then the netting will protrude into the surface of the food product. This results in a quilt-like surface pattern, where the intermediate and cojoined members press into the surface of the food product so that the food product bulges outwardly within the square, rectangle or other shaped formed by the longitudinal and transverse members.

In addition to the appearance, it is also desirable, particularly in relation to the cooking or curing process, to maintain a desirable shape, and to apply constant compressive force to the meat product during the cooking or curing process. The constant pressure ensures that air pockets do not readily form within the meat, as this may lead to spoilage. It is also desirable to ensure that, particularly during a process where the meat product is hung to cure, no elongation or stretching of the meat product occurs. It is desirable therefore, to hold the meat pieces together from two directions i.e. apply pressure both longitudinally and laterally.

In some instances, during a curing process, the weight of the meat product can cause the netting to stretch, thus resulting in a conical or tapered section from the hanging point to the beginning of the meat product. In many instances, depending on the type of the meat product, a small conical section of meat can be formed at the upper end. This particular section tends to be unsightly when the netting is removed, and is normally cut away and wasted. Alternatively, if the ends are used, there is poor sliceability due to variation in shape.

This problem results from the fact that elastic netting is normally non-elastic in the longitudinal direction. Only the circumferential members, which form a continuous spiral, are normally formed from elastic material. The longitudinal members are formed from conventional chain stitching. Apart from the normal stretch which results from the knitting process, the netting is generally inextensible in the longitudinal direction. Accordingly, as there is no longitudinal elasticity, stretching and thinning at the upper end of the netting will occur during the curing process.

Further, as the continuous spiral is a single strand of elastic thread, the overall extensibility of the net is limited. Accordingly, the net will be made slightly smaller than the ideal size of the meat product, which provides a suitable compressive force to the meat product only when it is of an ideal size. However, for meat products that are smaller, the net will be baggy and not provide a suitable indentation on the surface of the meat product. For meat products that are larger, the net may not fit around the meat product. Further, even if the net does fit over the meat product, most meat products taper at one or both ends which means the net will be baggy and not provide suitable indentation at the tapered portion.

Finally, as only the circumferential members are formed from elastic material, the compressive forces applied to the meat product produce a mild and superficial imprint upon the surface of the meat product.

Therefore, it is an aim of this invention to address the abovementioned problems by providing a netting which is elastically extensible both the longitudinal and transverse directions and which provides an improved indentation upon the surface of the meat product. Further, traditional netting normally only applies a square or rectangular pattern to the surface of a meat product. The present invention aims to provide different shapes, including a hexagon pattern.

SUMMARY

According to a first aspect, there is provided an openwork fabric comprising alternating cojoined and intermediate members, each intermediate member comprising a filament assembly and each cojoined member comprising a pair of filament assemblies that are worked together, the filament assemblies being extensible and the open work fabric being extensible in both longitudinal and transverse directions.

In one embodiment, each filament assembly transitions from an intermediate member in a first direction into a cojoined member and then transitions into a subsequent intermediate member in a second direction, such that each filament assembly extends substantially longitudinally along the net as the filament transitions through alternating cojoined and intermediate members.

In another embodiment, each cojoined member comprises a pair of adjacent filament assemblies that transition from adjacent first and second intermediate members by joining to form a first end of a cojoined member and separate at a second end of the cojoined member to form adjacent third and fourth intermediate members.

In another embodiment, each intermediate member comprises a chain stitch to form a filament assembly.

In another embodiment, each cojoined member comprises a chain stitch of a pair of filament assemblies.

In another embodiment, each cojoined member comprises two chain stitches of filament assemblies that are joined together.

In another embodiment, the filament assemblies are formed from one or more filaments that comprise elastic thread.

In another embodiment, the openwork fabric is tubular.

In another embodiment, the openwork fabric is a tubular net.

In another embodiment, each filament assembly comprises a composite filament.

In another embodiment, each composite filament comprises an inner layer and an outer layer, the inner layer being extensible and the outer layer comprising at least one spiral winding of an inextensible thread.

In another embodiment, composite filament comprises an inner layer and an outer layer, the inner layer being extensible and the outer layer comprising two or more threads braided together.

In another embodiment, the inner extensible layer comprises natural rubber, synthetic rubber or elastane.

According to a second aspect, there is provided a food product wrapped in the openwork fabric of described above.

A result of the openwork fabric being extensible in both longitudinal and transverse directions is that the fabric will provide variation in the shape and size of the hexagon pattern imparted upon the surface of a meat product, in response to meat products with a differing diameter i.e., at the centre of the meat product where the diameter is the largest the hexagons are stretched more and therefore are larger in size. Accordingly, the net provides variable indentations when stretched to different extents. Further, the extensible nature of the openwork fabric provides indentation on the surface of meat products of both small and large diameter.

BRIEF DESCRIPTION OF DRAWINGS

Embodiments of the present invention will be discussed with reference to the accompanying drawings wherein.

In the following description, like reference characters designate like or corresponding parts throughout the figures.

DESCRIPTION OF EMBODIMENTS

Figure 1:
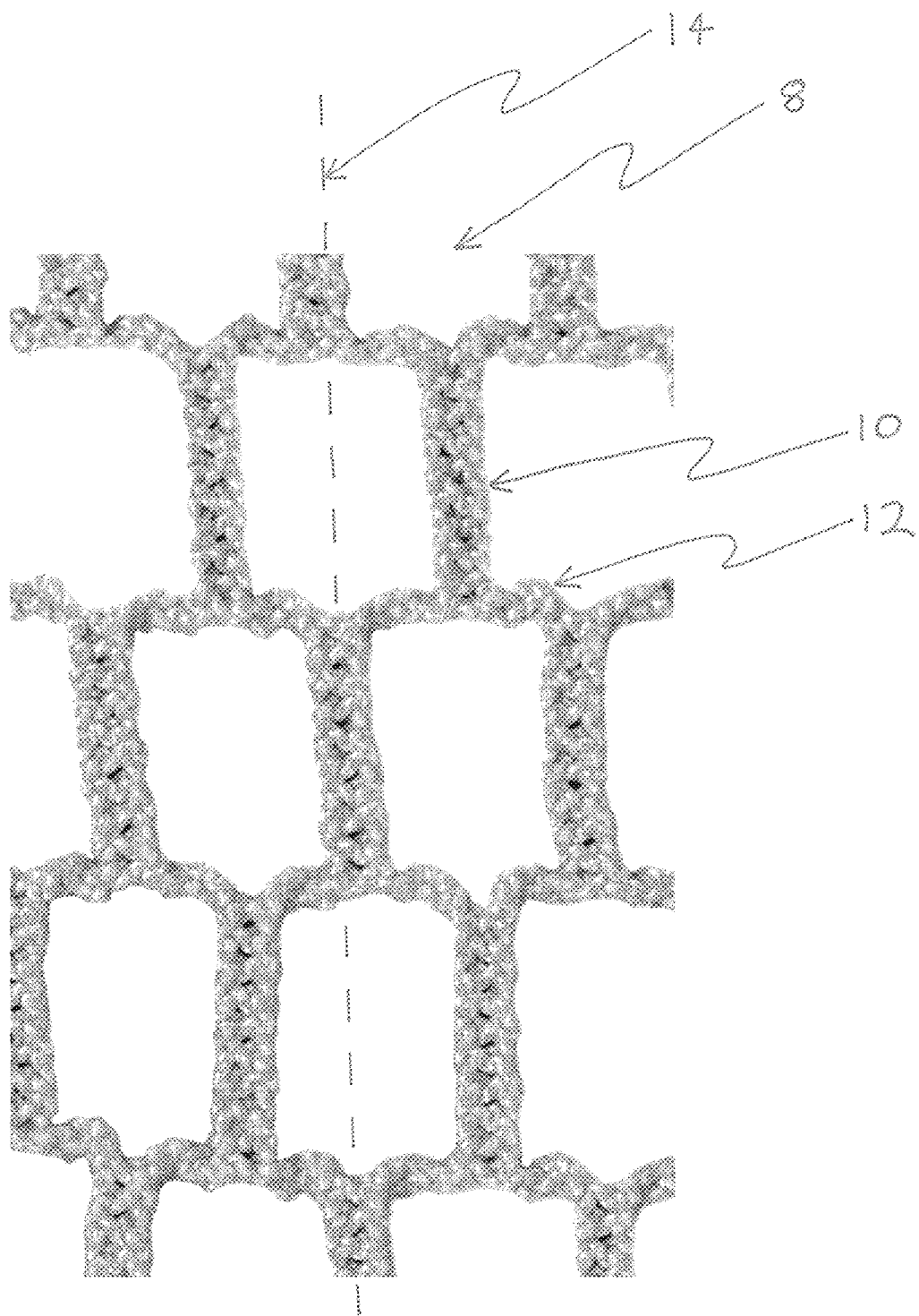
FIG. 1 is a view of the openwork fabric without tension being applied.

Referring now to FIG. 1, there is shown an openwork fabric or net 8 having cojoined members 10 and intermediate members 12 and constructed from extensible thread or filament assemblies. The cojoined members 10 have a finite length and are staggered relative to adjacent cojoined members. The staggered and adjacent cojoined members 10 are aligned in a longitudinal direction and are joined by intermediate members 12 that diverge left and right from the end of each cojoined member 10 to transition into the next two adjacent and staggered cojoined members.

The adjacent cojoined members 10 have intermediate members 12 at each end and form rows that extend laterally across the openwork fabric. The cojoined members 10 in any given row are staggered laterally relative to the cojoined members in any immediately adjacent row. The cojoined members 10 in every second row are substantially aligned longitudinally.

Figure 2:
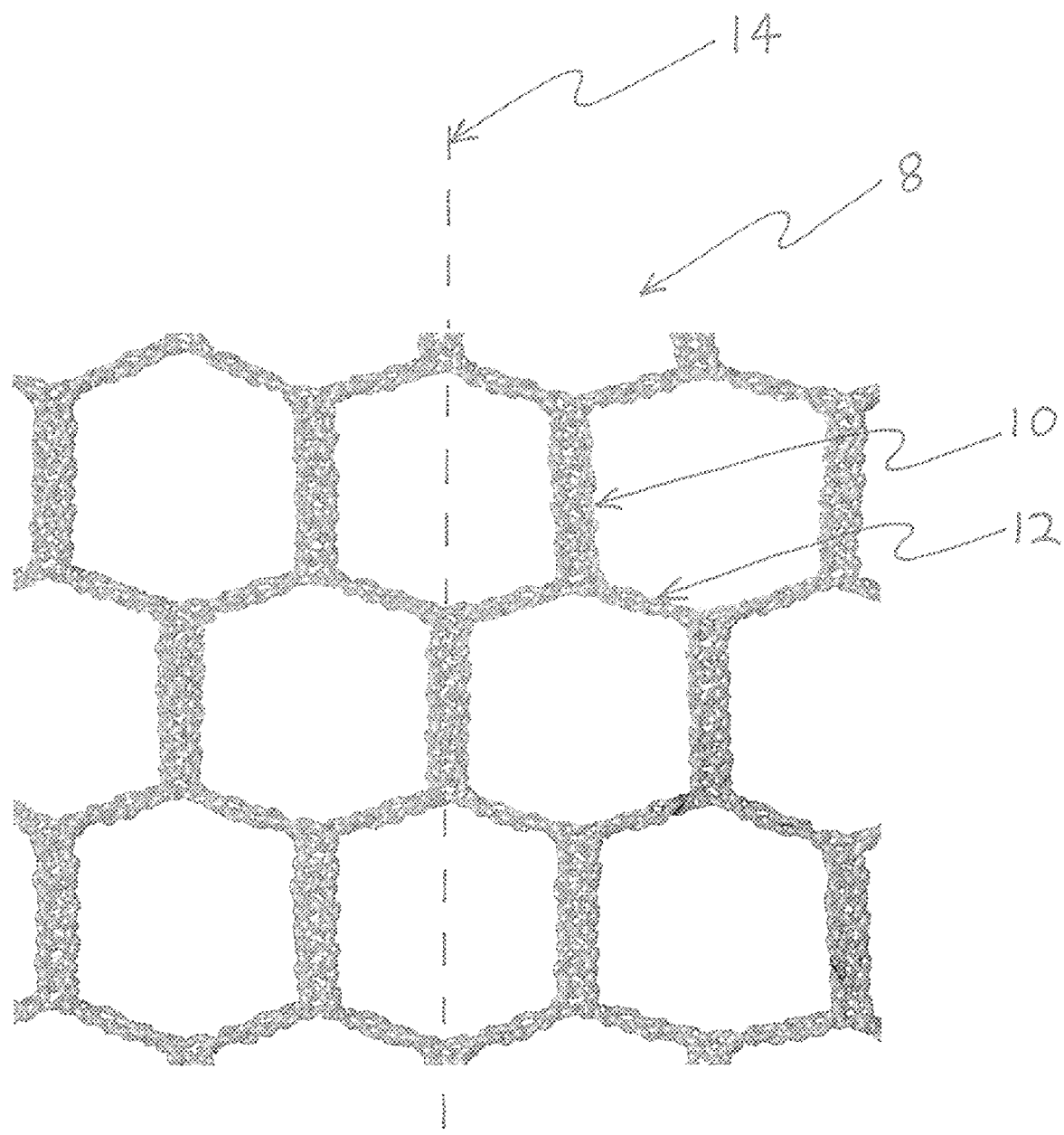
FIG. 2 is a view of the openwork fabric with tension being applied.

When tension is applied to the net, the extensible nature of the net provides stretch both longitudinally and laterally. When stretched, the resultant angles will change between adjacent cojoined members 10 and intermediate members 12 of the openwork fabric or net 8. Also, the shapes will change between said cojoined and intermediate members. This difference can be seen when comparing FIG. 1 and FIG. 2. FIG. 1 shows the net in substantially relaxed state, where the cojoined members 10 are aligned substantially longitudinally relative to the longitudinal axis 14 of the net 8 and the intermediate members 12 are aligned substantially laterally. FIG. 2 shows the net in a state where tension has been applied to the net both longitudinally and laterally, such that the apertures provided between adjacent and connected cojoined and intermediate members form hexagonal shapes. The cojoined members 10 are aligned substantially longitudinally and the intermediate members 12 are at an angle between substantially traverse and longitudinal, relative to the longitudinal axis 14 of the net 8.

Figure 3:
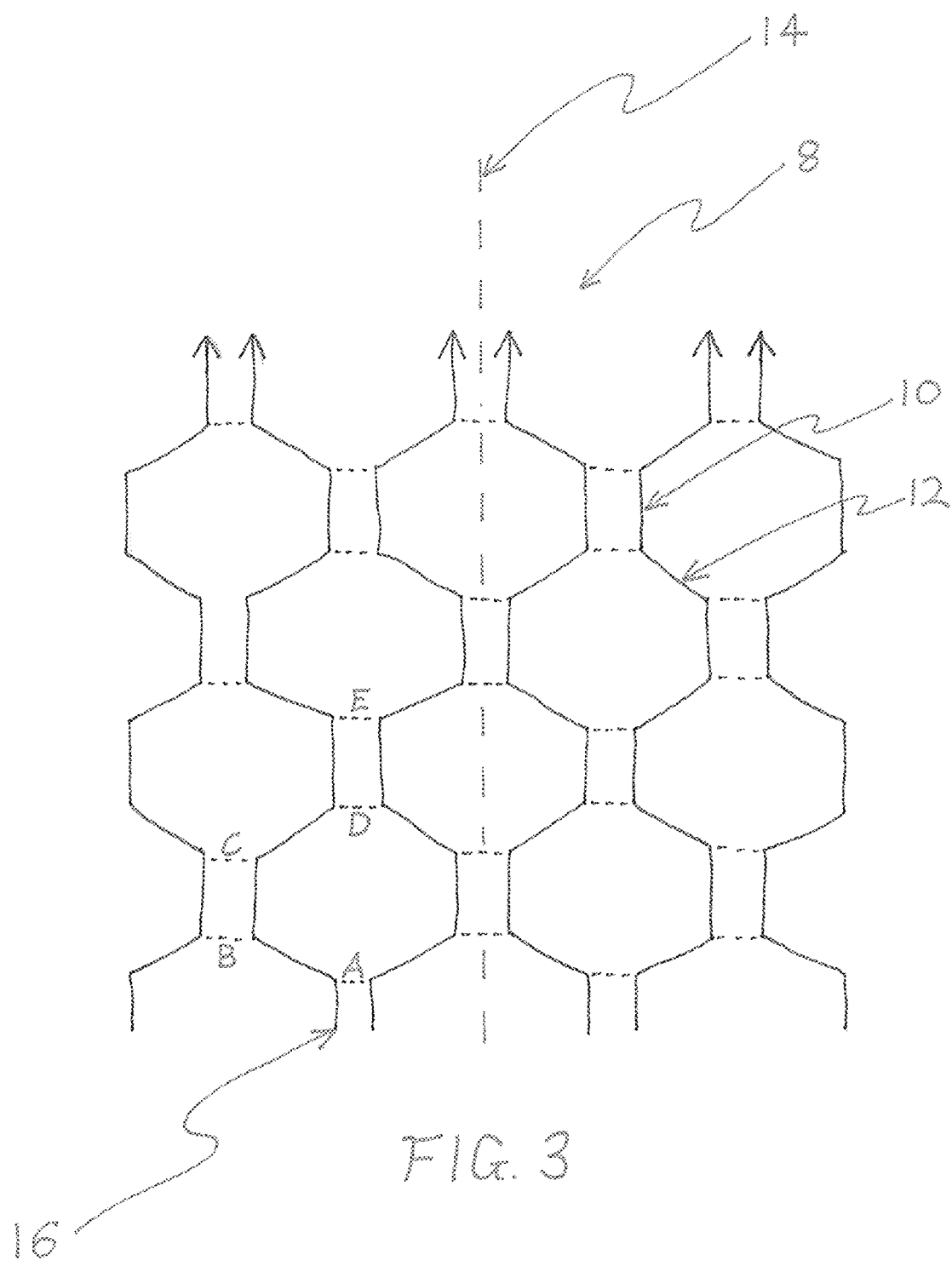
FIG. 3 is a view showing the path of each filament assembly along the openwork fabric.

For ease of reference, FIG. 3 shows schematically a path of each filament assembly 16 along the net 8. Each filament assembly 16 is aligned substantially longitudinally along the net as the filament assembly transitions through intermediate members 12 and cojoined members 10. An example will now be shown of the path of a filament assembly along the net. Starting from A, filament assembly 16 transitions through a first intermediate member in a first direction to B, through a first cojoined member to C before transitioning into a second intermediate member in a second direction to D and then through a second cojoined member to E. The sequence of transitions through the intermediate and cojoined members is repeated for filament assembly along the length of the net.

The paths of adjacent filament assemblies will now be described. Two filament assemblies diverge from a cojoined member at A into adjacent and separating intermediate members. A first filament assembly transitions from A to B as an intermediate member and converges with an adjacent intermediate member at B to form a cojoined member from B to C. The filament assemblies in the cojoined member at C then diverge where the first filament assembly transitions from C to D as an intermediate member and then converges with an adjacent intermediate member at D. The filament assemblies that separated at A are the same filament assemblies that converge at D. The filament assemblies then form a cojoined member from D to E. A further explanation is that each cojoined member comprises a pair of adjacent filament assemblies that transition from adjacent first and second intermediate members into a first end of a cojoined member and then separate at a second end of the cojoined member to form adjacent third and fourth transverse sections. The sequence of transitions through the transverse and cojoined members is repeated for each filament assembly along the length of the net.

Each intermediate member 12 is a filament assembly. Each filament assembly may comprise at least one filament or composite filament. Each intermediate member may be a chain stitch of at least one filament or composite filament. In an alternative, each intermediate member may be at least one type of suitable stitch.

Each cojoined member 10 comprises two filament assemblies worked together and may comprise two or more filaments or composite filaments. Two adjacent filament assemblies are worked together to form each cojoined member 10. In an embodiment, each cojoined member 10 may be a chain stitch of two filament assemblies i.e. two filament assemblies that are paired and then worked into a series of chain stitches. In an alternative, each cojoined member 10 may be two chain stitches of filament assemblies that are joined or worked together i.e. two series of chain stitches that are joined or worked together. In another alternative, each cojoined member 10 may be any suitable number of chain stitches of two filament assemblies. In another alternative, each cojoined member 10 comprises at least one type of suitable stitch.

Figures 4, 5:
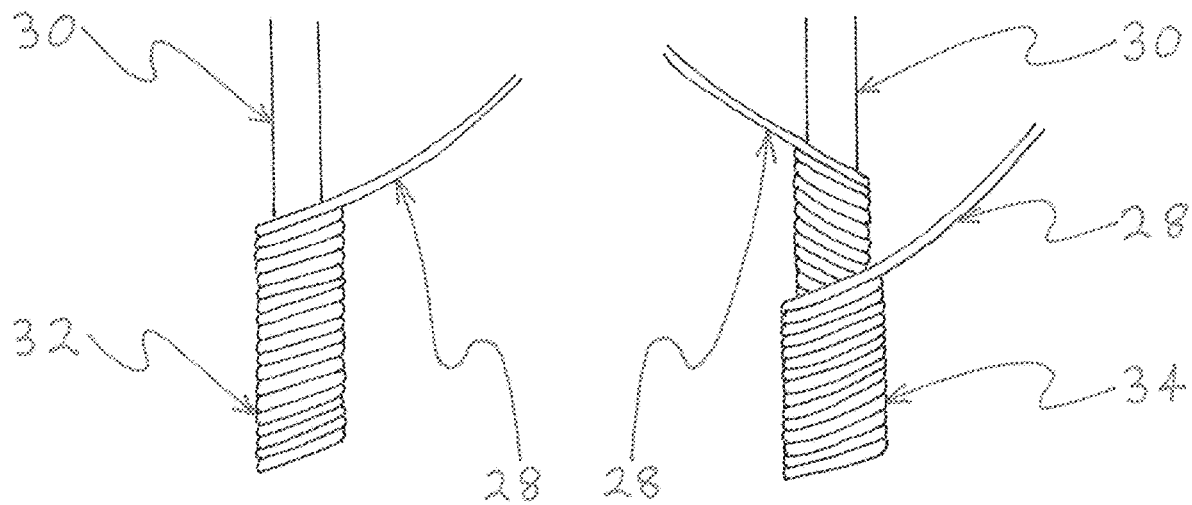
FIG. 4 is an embodiment of a filament comprising at least one elastic strand covered by a single substantially inextensible thread wrapped in a single direction.
FIG. 5 is another embodiment of a filament comprising at least one elastic strand covered by two substantially inextensible threads wrapped in opposite directions.
Figure 6:
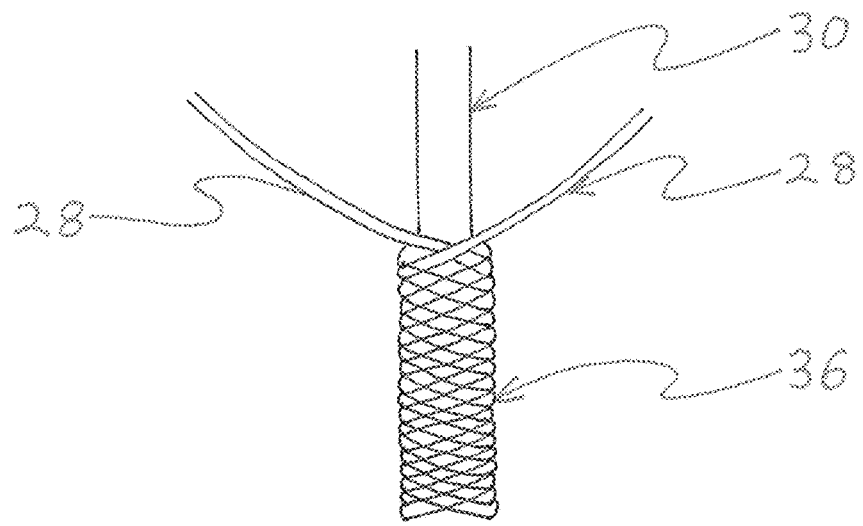
FIG. 6 is another embodiment of a filament comprising at least one elastic strand covered by two or more substantially inextensible threads that are braided or otherwise interwoven around the at least one elastic strand.

Referring now to FIGS. 4 to 6, there are shown embodiments of a filament or yarn of the present invention. Each filament or yarn is made from at last least one elastic strand 30 covered by at least one substantially inextensible thread 28. FIG. 4 shows an embodiment of a filament comprising at least one elastic strand 30 covered by a single substantially inextensible thread 28 wrapped in a single direction i.e. as a spiral winding 32. FIG. 5 shows an embodiment of a filament comprising at least one elastic strand 30 covered by two substantially inextensible threads wrapped in opposite directions 34. FIG. 6 shows an embodiment of a filament comprising at least one elastic strand 30 covered by two or more substantially inextensible threads that are braided or otherwise interwoven around the at least one elastic strand in at least one direction 36. In an embodiment, two or more elastic strands are present in each filament or yarn. In an alternative, each filament is of any suitable construction that provides extensibility to the resultant filament i.e. any elasticated yarn with any combination could be used e.g. no covering, single or air covered. Accordingly, the filament may be of a non-composite or composite construction suitable for the present openwork fabric. The elastic material in the filament or yarn may be rubber, synthetic rubber, elastane or any suitable extensible material. The inextensible thread covering may be made from natural fibres including cotton, bamboo, hemp and wool fibres or from synthetic fibres including polyester, nylon and rayon.

The covered elastic or rubber used in each filament is low stretch in order to behave more like a rigid polyester yarn. However, when multiple elastic yarns are combined as a netting, the resultant netting has sufficient stretch to apply pressure onto the meat. A non-covered elastic or rubber will normally over stretch and is difficult to knit successfully to create a suitable meat netting product. The covering also protects the raw rubber from heat damage during cooking. The covering also protects the meat from the odour of bare rubber that can occur when the meat is being cooked.

The knitting process is well known for rigid yarns such as polyester and nylon. This invention uses an elastic, stretchable yarn to create similar shaped products that impart a pull in fabric that imparts a deep indentation onto the meat surface and along the full length of the meat product.

The knitting machine is an established braiding machine that uses circular warp knitting. The elastic yarns are held with a set (i.e. 2) of counter rotating rings that move the yarns from one needle position to another to a predetermined pattern making the hexagon shape required. Various sized Hexagon shapes are possible by varying the number of stitches per circular rotation movement, for each hexagon pattern shape. The difficulty in producing this product is the management of the elastic yarn and the even and balanced supply rate of the covered rubber into the knitting head.

This product can also have variable size hexagons and other shapes within the same manufacturing patterning. This means that the meat product can have a number of different shapes of differing sizes on the surface of the one meat product. This is achieved by a particular programming of the machines to enable this software to create these varied patterns.

In the normal use of the present net or openwork fabric, the net is stretched or expanded over the particular product upon which it is used and it remains in such expanded condition during such use. In such expanded condition, and while the net is being placed over the product, it is subjected to longitudinal (i.e. lengthwise) and to transverse stretching thereof. The combination of an extensible composite thread and the stitching method provides a net with both a two-way (i.e. longitudinal and lateral) stretch and higher yield strength than the use of straight lengths of extensible composite thread. The advantage of this combination is that the net provides heavy indentation on the particular product retained within the net.

As the fabric is extensible in both longitudinal and transverse directions, the fabric has the characteristic of adapting the shape and size of the hexagon to the differing diameter of the meat product. i.e., at the centre of the meat product where the diameter is the largest the hexagons are stretched more and therefore are larger in size. At the two ends of a rugby ball shaped meat product, where the diameter of the meat product is reducing, the imprint on the meat is still strong due to the elastic material, but with less stretch the shapes are smaller. Accordingly, the net provides variable indentations when stretched to different extents. In addition to the larger pattern, when stretched, the net provides greater or deeper indentation. This provides an aesthetically pleasing pattern to the surface of the meat that has not been seen in this technical field before. Existing meat nets are substantially inextensible in the longitudinal direction and accordingly the pattern on the surface of the meat does not substantially vary with the size of the meat retained within the net. These existing meat nets, with elastic characteristics in a lateral (i.e. width) direction, are square or rectangular in shape.

The net or openwork fabric of the present invention provides even and heavy pressure to meat products to help prevent the formation of air pockets. Once contained, wrapped or covered within the netting, the meat products may be smoked, boiled, streamed, roasted, cured or subjected to any suitable process.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A tubular net formed of an openwork fabric comprising alternating cojoined and intermediate members, each intermediate member comprising a filament assembly and each cojoined member comprising a pair of filament assemblies that are worked together, each filament assemblies being extensible and comprises of one or more filaments that comprise elastic thread such that the open work fabric is elastically extensible in both longitudinal and transverse directions such that when stuffed with a food product the alternating cojoined and intermediate members stretch to provide indentations on the food product to define a surface pattern wherein the shape and size varies with a diameter of the food product retained within the tubular net
wherein each cojoined member comprises a pair of adjacent filament assemblies that transition from adjacent first and second intermediate members by joining to form a first end of a cojoined member and separate at a second end of the cojoined member to form adjacent third and fourth intermediate members, and each intermediate member comprises a chain stitch to form a filament assembly, and each cojoined member comprises a chain stitch of a pair of filament assemblies.

2. The tubular net formed of an openwork fabric of claim 1, wherein each filament assembly transitions from an intermediate member in a first direction into a cojoined member and then transitions into a subsequent intermediate member in a second direction to form a hexagonal pattern, such that each filament assembly extends substantially longitudinally along the openwork fabric as the filament transitions through alternating cojoined and intermediate members.

3. The tubular net formed of an openwork fabric of claim 1, wherein each cojoined member comprises two chain stitches of filament assemblies that are joined together.

4. The tubular net formed of an openwork fabric of claim 1, wherein the filament assemblies are formed from one or more filaments that comprise one or more non-composite elastic threads.

5. The tubular net formed of an openwork fabric of claim 1, wherein each filament assembly comprises a composite filament.

6. The tubular net formed of an openwork fabric of claim 5, wherein each composite filament comprises an inner layer and an outer layer, the inner layer being extensible and the outer layer comprising at least one spiral winding of an inextensible thread.

7. The tubular net formed of an openwork fabric of claim 6, wherein the inner extensible layer comprises natural rubber, synthetic rubber or elastane.

8. The tubular net formed of an openwork fabric of claim 5, wherein each composite filament comprises an inner layer and an outer layer, the inner layer being extensible and the outer layer comprising two or more threads braided together.

9. The tubular net formed of an openwork fabric of claim 8, wherein the inner extensible layer comprises natural rubber, synthetic rubber or elastane.

10. The tubular net formed of an openwork fabric of claim 1 wherein, in use, the openwork fabric provides indentations on the surface of a food product along a full length of the food product in which the diameter varies with length.

11. A meat food product covered with the tubular net of claim 1.

12. The meat food product of claim 11 wherein the meat product is a rugby ball shaped meat product with a hexagonal surface pattern wherein a size of a hexagon increases with the diameter of the meat product.

* * * * *